(12) United States Patent
Yoshikawa et al.

(10) Patent No.: US 6,776,918 B1
(45) Date of Patent: Aug. 17, 2004

(54) TITANIUM COMPOSITE MATERIAL

(75) Inventors: Susumu Yoshikawa, Ikeda (JP); Yuko Tanaka, Ikeda (JP); Teruki Takayasu, Ikoma (JP); Hiromasa Ogawa, Ikoma (JP); Kinji Onoda, Ikoma (JP); Masatada Makino, Ikoma (JP); Takashi Nishiyama, Ikoma (JP)

(73) Assignees: Showa Co., Ltd. (JP); Japan as represented by Secretary of Agency of Industrial Science and Technology (JP)

( * ) Notice: Subject to any disclaimer, the term of this patent is extended or adjusted under 35 U.S.C. 154(b) by 0 days.

(21) Appl. No.: 09/720,450

(22) PCT Filed: Apr. 7, 2000

(86) PCT No.: PCT/JP00/02253

§ 371 (c)(1),
(2), (4) Date: Dec. 8, 2000

(87) PCT Pub. No.: WO00/61365

PCT Pub. Date: Oct. 19, 2000

(30) Foreign Application Priority Data

Apr. 8, 1999  (JP) ............................................. 11-101647

(51) Int. Cl.⁷ .............................. C23F 3/02; C23F 3/03; C23F 15/00; C23C 22/80
(52) U.S. Cl. ......................... 216/96; 216/100; 216/108; 216/109; 427/307; 427/327; 427/388.1; 148/240; 148/247; 148/279; 148/281
(58) Field of Search .................................. 428/457, 458, 428/332; 148/281, 279, 247, 240; 216/96, 100, 101, 108, 109; 427/307, 327, 309, 388.1

(56) References Cited

U.S. PATENT DOCUMENTS 4,414,039 A    11/1983  Thoma
5,004,626 A  *  4/1991  Dong et al. .................... 427/58
5,776,626 A  *  7/1998  Tsukahara et al. ............ 429/59
5,866,272 A  *  2/1999  Westre et al. ................ 428/593
5,869,140 A  *  2/1999  Blohowiak et al. ......... 427/307

FOREIGN PATENT DOCUMENTS

| JP | 62-10299 |   | 1/1987 |
|----|----------|---|--------|
| JP | 60-146809 | * | 1/1987 |
| JP | 64-44010 |   | 2/1989 |
| JP | 401036788 A | * | 2/1989 |
| JP | 01 208128 |   | 8/1989 |
| JP | 1-208128 |   | 8/1989 |
| JP | 5-169589 |   | 7/1993 |
| JP | 05 169589 |   | 7/1993 |
| JP | 06-225668 |   | 8/1994 |
| JP | 06-340850 | * | 12/1994 |
| JP | 07-109208 |   | 4/1995 |
| JP | 07330297 | * | 6/1997 |
| JP | 2000-7513 |   | 1/2000 |
| WO | WO 97/49756 |   | 12/1997 |

OTHER PUBLICATIONS

Hawley's Condensed Chemical Dictionary, 13th edition 1997, pp. 816.*

* cited by examiner

Primary Examiner—Paul Thibodeau
Assistant Examiner—Nikolas J. Uhlir
(74) Attorney, Agent, or Firm—Knobbe, Martens, Olson & Bear, LLP

(57) ABSTRACT

The invention provides a titanium composite material comprising a bonded laminate having a layer of macromolecular material bonded to the modified surface of a titanium sheet or a titanium alloy sheet, and a process for preparing a titanium composite material, the process comprising the step of bonding a macromolecular material to a titanium sheet or a titanium alloy sheet having a modified surface to be bonded.

13 Claims, 2 Drawing Sheets

TITANIUM COMPOSITE MATERIAL

FIELD OF THE INVENTION

The present invention relates to a titanium laminate or a titanium composite material having a multilayered structure which comprises a titanium sheet or a titanium alloy layer and a layer of a macromolecular material.

BACKGROUND ART

Since titanium and an alloy comprising mainly of titanium (hereinafter referred to as "titanium material") have inherent excellent properties such as lightweight property, high strength (high specific strength) and high corrosion resistance, titanium materials are used in various fields for applications not only as industrial materials such as fuselage materials and component materials for aircraft, materials for heat exchangers and electrode materials, but also as building materials such as roof materials and wall materials, and materials for goods of livelihood such as materials for decoration articles, sporting goods and equipment for leisure time amusement.

However, titanium materials are expensive compared with other materials for use (e.g. about 10 times higher in cost than stainless steel generally used as a corrosion-resistant material) and are poor in processability. For these drawbacks, titanium materials are not replacing other materials and unlikely to be used in increasing amounts despite their excellent properties as described above.

To reduce the costs of expensive titanium materials, an attempt was made to provide a "composite material" which comprises an inexpensive material covered with a thin sheet of titanium material by means of a metallurgical or mechanical process. The attempt was partly realized for commercial products.

However, it is impossible to form a coating layer of titanium material on the surface of other materials by an inexpensive wet plating method such as an electroplating method. Consequently a layer of titanium material has been conventionally provided by making a composite laminate using a dry plating process such as PVD, CVD or the like or a cladding method.

For example, in the case of PVD, a titanium material is vaporized under a high vacuum and is deposited on to the surface of a target substrate to form a coating film. However, the PVD has a drawback of being carried out at a high temperature of 100 to 200° C., whereby substrates are limited to those having resistance to high-temperature heat.

The CVD is conducted by heating a material containing a titanium to chemically react the material with a substrate, thereby forming a coating film on the substrate. Thus, the CVD process employs a higher temperature ranging from about 500 to about 700° C. than the PVD process, and has a drawback that a titanium material can be applied only to a substrate having high heat resistance.

Further, both of PVD and CVD require large-size equipment to obtain a coated material suited for practical use. Consequently these methods entail drawbacks that a substrate to be coated with titanium is inevitably limited in shape and size, thereby increasing the costs of a composite material.

The cladding method intended to give a laminated composite material is advantageous over the PVD and CVD in that the cladding eliminates needs for a high vacuum device required by the PVD and for a reaction device required by the CVD. But the cladding necessitates the formation of a titanium film of greater thickness than required in order to metallurgically or mechanically bond the titanium material to a substrate of other metals. Moreover, the cladding process has further drawbacks of requiring large-scale, powerful production equipment and ntails a difficulty in small-lot production, resulting in an increase in costs for composite materials.

Japanese Examined Patent Publication No.225851/1996 discloses a technique for "preventing the deposition of marine foiling organism on ships or offshore structures made of fiber-reinforced plastics (FRP) by applying titanium, zirconium, tantalum, niobium or an alloy containing chiefly any of them with an adhesive to a portion of the ship or offshore structure in contact with seawater." The disclosed technique can effectively prevent the deposition of oceanic organisms, but the technique has a drawback. A titanium material has a noticeable spring-back characteristic compared with stainless steel and the like. Accordingly spring back is brought about by the titanium sheet after coating the FRP substrate with the titanium material, making it likely to induce peel between the titanium sheet and the adhesive layer satisfactorily bonded to the FRP substrate.

For the reason, among others, that a titanium composite material has a much higher affinity with oxygen than other metals, a stable passive state film of titanium oxide is invariably formed on the surface of titanium material. Consequently it is difficult to maintain a firm bond at an interface between the adhesive and the titanium material due to the formed oxide film. From a practical viewpoint, a great difficulty is encountered in preparing a composite material of high performance by bonding a titanium material to a macromolecular material with an adhesive.

A principal object of the present invention is to provide a novel technique for practical use in various fields of a titanium material having excellent properties at a low cost.

DISCLOSURE OF THE INVENTION

The present inventors conducted extensive research, directing attention to the foregoing state of the art and found the following. Use of a thin sheet or foil of titanium material (hereinafter referred to simply as "titanium sheet" or "titanium alloy sheet"), which was not used in conventional composite materials, results in an inexpensive, useful, novel composite material, when the surface of the titanium sheet is treated for property modification and the treated titanium sheet is bonded to a macromolecular material with an adhesive.

The present invention provides the following titanium composite materials.

1. A titanium composite material comprising a bonded laminate having a layer of macromolecular material bonded to the modified surface of a titanium sheet or a titanium alloy sheet.
2. The titanium composite material as defined in item 1, wherein the titanium sheet or the titanium alloy sheet has a thickness of 0.1 to 500 $\mu$m.
3. The titanium composite material as defined in item 2, wherein the titanium sheet or the titanium alloy sheet has a thickness of 1 to 50 $\mu$m.
4. The titanium composite material as defined in any of items 1 to 3, wherein the layer of macromolecular material is formed of a thermosetting resin or a thermoplastic resin.
5. A process for preparing a titanium composite material, the process comprising the step of bonding a macromolecular material to a titanium sheet or a titanium alloy sheet having a modified surface to be bonded.
6. The process as defined in item 5, wherein the modified surface of the titanium sheet or titanium alloy sheet to be bonded has substantially no passive state film thereon.
7. The process as defined in item 6, wherein the modified surface of the titanium sheet or the titanium alloy sheet to be bonded is one from which a passive state film has been removed by etching. 8. The process as defined in item 6, wherein the surface of the titanium sheet or titanium alloy sheet to be bonded is modified by removing the passive state film with hydrofluoric acid.
9. The process as defined In item 5, wherein the modified surface of the titanium sheet or titanium alloy sheet to be bonded is one which is coated with a primer.
10. The process as defined in item 9, wherein the primer is a coupling agent.
11. The process as defined in item 10, wherein the coupling agent is of the titanate type having an unsaturated bond in the side chain.
12. The process as defined in item 5, wherein the modified surface of the titanium sheet or titanium alloy sheet to be bonded is one which is treated for preventing the re-formation of passive state film thereon after removal of the passive state film therefrom by etching.
13. The process as defined in item 12, wherein the treatment for preventing the re-formation of passive state film is a dipping treatment using a reducing agent.
14. The process as defined in item 13, wherein the reducing agent is an aqueous solution of formic acid.
15. The process as defined in item 10, wherein the treatment for preventing the re-formation of passive state film is an electrolytic reduction treatment in the presence of cathodic polarization.
16. The process as defined in item 15, wherein the current density in the electrolytic reduction treatment is not lower than 0.5 A/dm$^2$.
17. The process as defined in item 16, wherein the current density is in the range from 1 to 50 A/dm$^2$.
18. The process as defined in item 5, wherein the modified surface of the titanium sheet or titanium alloy sheet to be bonded is one which is coated with a primer after treatment for preventing the re-formation of passive state film following the removal of passive state film by etching.
19. The process as defined in item 5, wherein the titanium sheet or titanium alloy sheet has a thickness of 0.1 to 500 µm.
20. The process as defined in item 5, wherein the titanium sheet or titanium alloy sheet has a thickness of 1 to 50 µm.
21. The process as defined in item 5, wherein the layer of macromolecular material is formed of a thermosetting resin or a thermoplastic resin.
22. The process as defined in item 5, wherein a thermosetting resin is bonded with an adhesive to the titanium sheet or titanium alloy sheet having a modified surface to be bonded.
23. The process as defined in item 22, wherein the thermosetting resin is bonded to the titanium sheet or titanium alloy sheet using an acrylic resin-type or butyl rubber-type tackifier.
24. The process as defined in item 5, wherein a melt of a thermoplastic resin is press-bonded to the titanium sheet or titanium alloy sheet having a modified surface to be bonded.

SPECIFIC EMBODIMENTS OF THE INVENTION

Figure 1:
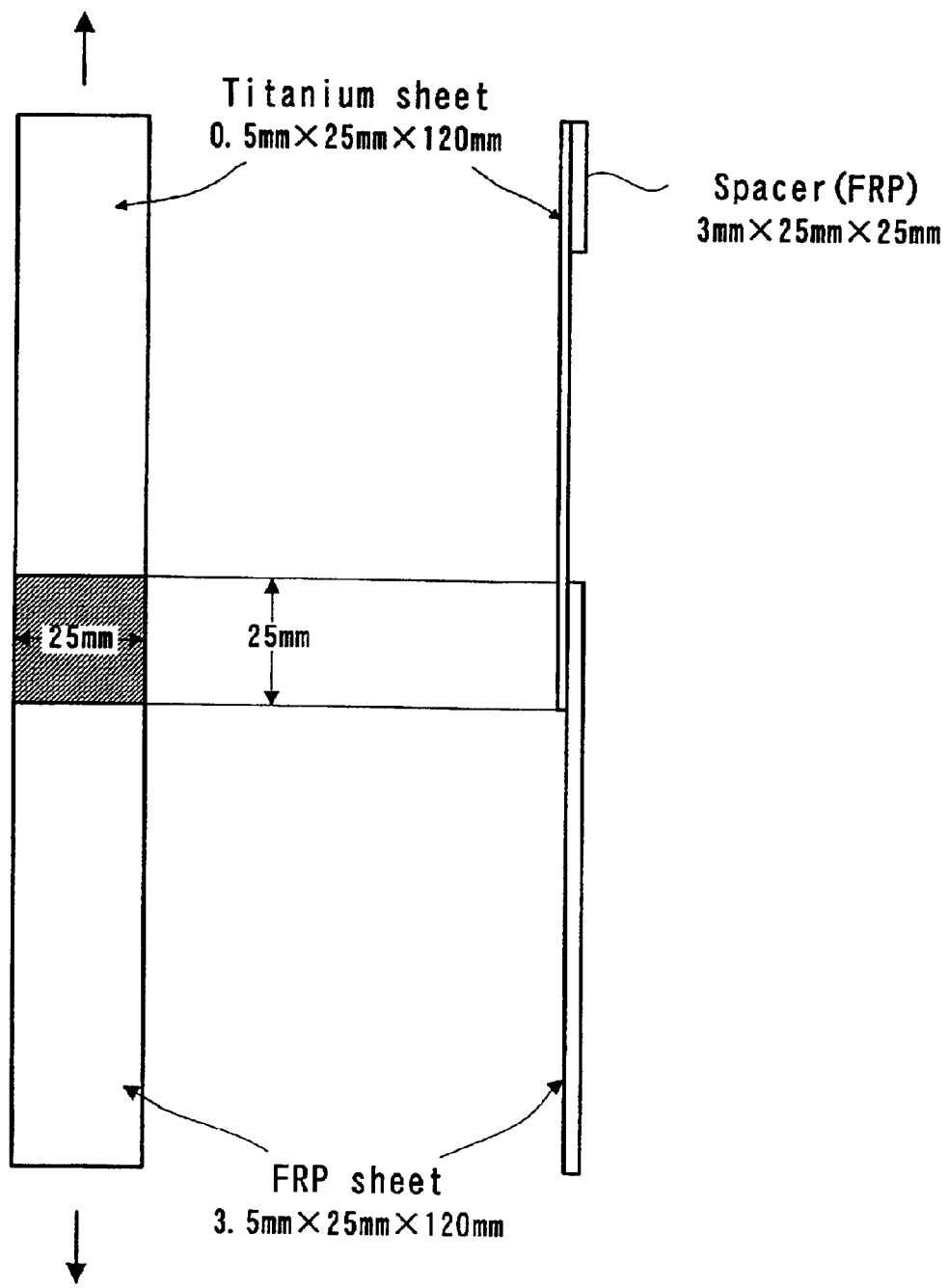
FIG. 1 is a view showing a specimen for measuring the tensile bond strength of the titanium composite material of the invention.

Titanium or various titanium alloys suited to a purpose can be used in the present invention. Useful titanium alloys are not limited and include, for example, Ti-6Al-4V, Ti-0.5Pd, etc.

Titanium and titanium alloys (hereinafter referred to simply as "titanium") have a marked spring-back characteristic compared with other metals such as stainless steel, aluminum, copper and the like. Moreover, titanium has a pronounced affinity with oxygen so that a stable firm passive state film invariably exists on the surface of titanium. For these reasons, even if a titanium material is bonded to a macromolecular material with an adhesive to give a composite material, the two materials would be imparted a poor affinity with each other or low adhesion thereto. Consequently, in order to give a composite material for use, it is necessary to use a titanium foil or thin sheet having a relatively low degree of spring-back characteristic (approximately 0.1 to 500 µm in thickness, hereinafter referred to as "titanium sheet"). Further the surface of titanium sheet to be bonded to the macromolecular material layer should be treated for property modification before being bonded.

The surface of titanium sheet to be bonded can be treated for property modification, for instance, by removing the passive state film or by preventing the regeneration of passive state film.

The methods of removing a passive state film from the surface of titanium sheet include, for example, an etching method using an aqueous solution of an acid.

Etching agents useful in the etching method are, for example, aqueous solutions of acids such as hydrofluoric acid, ammonium hydrogenfluoride, sulfuric acid, hydrochloric acid, oxalic acid and the like. Among them, an aqueous solution of hydrofluoric acid is preferred.

The effectiveness of removing a passive state film by etching depends mainly on a concentration of an acid in an aqueous solution. For example, when an aqueous solution of hydrofluoric acid is used, the concentration is at least 0.5 wt. %, preferably about 1 to about 5 wt. %. The etching temperature is variable depending on the thickness of the passive state film, the concentration of hydrofluoric acid in the aqueous solution and the like, but is usually about 10 to about 40° C. preferably about 20 to about 30° C.

Even after removing the passive state film from the surface of titanium sheet by etching, a new passive state film may be formed on the surface of titanium sheet having a marked affinity with oxygen in the atmosphere. Consequently it is desired to carry out a reduction treatment for preventing the re-formation of passive state film after an etching treatment to obtain a composite material having a high bonding power.

Such reduction treatment can be conducted, for example, by dipping the titanium sheet in a reducing agent such as an aqueous solution of formic acid, sodium borohydride or the like after removal of passive state film or by performing electrolytic reduction in the presence of cathodic polarization.

When the titanium sheet is dipped in an aqueous solution of reducing agent, the concentration of reducing agent, dipping time, etc., are variable depending on the kind of reducing agent and the like, but are usually about 1 to about 25 wt % (preferably about 5 to about 20 wt %) and about 5 to about 60 minutes (preferably about 10 to about 50 minutes).

To prevent the re-formation of passive state film by electrolytic reduction in the presence of cathodic polarization, the reduction is performed at a current density of not lower than 0.5 A/dm$^2$, preferably about 1 to about 50 A/dm$^2$. An anode electrode as opposed electrode is composed of platinum, titanium coated with platinum or like inert materials.

Usable as an electrolyte are aqueous solutions of ammonium hydrogenfluoride, ammonium fluoride, sodium fluoride, ammonium formate, sodium formate, sodium sulfate or like electrolytes. Among these electrolytes, it is preferred to use ammonium hydrogenfluoride further having a capability of etching on a titanium sheet. There is no limitation on the concentration of an electrolyte in an aqueous solution insofar as sufficient conductivity is assured in the electrolytic treatment. Usually the concentration is about 1 to about 5 wt. %.

The reduction treatment for preventing the re-formation of passive state film on the etched surface of titanium sheet may be a reducing agent treatment in combination with an electrolytic reduction in the presence of cathodic polarization.

To activate a passive state film by coating the surface of a titanium sheet, a titanate-type coupling agent, an isocyanate-type primer or the like may be applied to the surface thereof. Among these primers, preferred is a titanate-type coupling agent having an unsaturated bond in the side chain, such as a tetraoctyl bisphosphite titanate-type coupling agent and the like. The titanium sheet can be coated with the coupling agent in the conventional manner, for example, by applying the coupling agent diluted with a solvent such as xylene to the titanium sheet and drying the coating at about 60 to about 120° C. for about 30 minutes to about 2 hours.

The composite material of the present invention can exhibit strength properties which are attributable to the layer of macromolecular material integrally bonded to the titanium sheet as detailed later so that the thickness of the titanium material layer can be markedly reduced. The thickness of the titanium sheet is sufficient insofar as the composite material is allowed to show the inherent corrosion resistance and weatherability of titanium material. The thickness of useful titanium sheets is usually 0.1 to 500 $\mu$m (preferably about 1 to about 100 $\mu$m, more preferably about 10 to about 50 $\mu$m). If the titanium sheet has too small a thickness, the composite material of the invention is likely to be unsatisfactory in resistance to scratching impact and the like although it is unlikely to raise a problem of physical strength (such as tensile strength, bending strength, etc.) of composite material. On the other hand, if the titanium sheet is too thick, a higher cost would be incurred and the thick sheet leads not only to limited utility but also to marked spring-back characteristic and deteriorated adhesion to the layer of macromolecular material.

Usable macromolecular materials are various and include, for example, thermoplastic resins, thermosetting resins and macromolecular materials containing them as the main component.

Examples of useful thermoplastic resins are AS resin, ABS resin, acrylic resin, polyvinyl chloride, polycarbonate, polypropylene, polyester, polyamide, ethylene-vinyl acetate copolymers and the like which may be contained as the main component in the macromolecular material.

These thermoplastic resins have a property of becoming melted at a temperature of about 100 to about 250° C. Consequently a titanium composite material comprising a titanium sheet and a layer of thermoplastic resin can be easily produced by superposing a melt of thermoplastic resin by extrusion molding or by hot press molding on a titanium sheet having a surface modified in the manner as described above which surface is to be bonded.

When rosin or a rosin derivative or like tackifier, a thermoplastic elastomer for adjusting the softening temperature and the like are added to the components of the foregoing thermoplastic resin, the layer of thermoplastic resin is made into a hot melt by heating the titanium composite material of the invention, whereby the composite material can be bonded to a specified location.

The titanium composite material of the present invention having a layer of macromolecular material formed of a thermoplastic resin is a novel, inexpensive material possessing the flexibility of thermoplastic resin as well as the inherent excellent corrosion resistance and weatherability of titanium.

The titanium composite material of the present invention with excellent processability can be joined to the surface of an object or a constructed body having various profiles in a manner to deformably conform to the surface thereof.

When a thermoplastic macromolecular material is used as a tackifier or an adhesive, a mold release liner sheet may be attacked to the surface of a thermoplastic macromolecular material layer on a titanium sheet, and may be peeled off before use so as to fix the macromolecular material layer to the surface of specific objects or constructed bodies, with the result that the excellent properties such as corrosion resistance and light resistance can be imparted by this simple procedure to the surface of specific objects or constructed bodies.

Further the titanium composite material of the invention can be made suitable for use under various environments and for various purposes by forming a layer of thermoplastic macromolecular material from a combination of at least two species of tackifiers and adhesives. For instance, when the titanium composite material of the invention is used in water or salt water, an acrylic resin-type tackifier excellent in initial bond strength is applied to a central portion of the titanium composite material, and then an epoxy-type adhesive superior in resistance to water or salt water is applied to a surrounding portion thereof, whereby the titanium composite material is given a high initial adhesion to a specific object or constructed body, and can be used for purposes which require a long term resistance to water or salt water.

When a modified silicone resin, a rubber-type resin or the like is kneaded with an epoxy-type adhesive which is superior in resistance to water or salt water but inferior in flexibility or elasticity, resistance to water or salt water and flexibility or elasticity can be given to a single layer of adhesive serving as a macromolecular material layer.

Useful thermosetting resins for use in the macromolecular material layer include, for example, unsaturated polyester resin, phenol resin, urea resin, epoxy resin and composite materials (FRP) containing these thermosetting resin as a matrix. Molded sheets or films formed of these thermosetting resins will not be softened by re-heating so that they are suited for forming a layer of macromolecular material in a titanium composite material which is required to have strength, structural stability and the like.

To produce a titanium composite material comprising a thermosetting material and a titanium sheet, the two materials are bonded together by an adhesive. Useful adhesives are not limited and include, for example, epoxy resin-type adhesives, silicone-type adhesives, acrylic resin-type tackifiers, butyl rubber-type tackifiers, etc.

The thickness of the macromolecular material layer is variable depending on the kind of thermoplastic resin or thermosetting resin used, thickness of titanium material layer, utility of titanium composite material and the like. Its thickness ranges from about 0.01 to about 50 mm, preferably from about 0.01 to about 10 mm.

Industrial Applicability

The utility of a titanium or titanium alloy sheet is limited because of their insufficient processability and expensiveness despite their outstanding properties, but the utility thereof can be remarkably extended by combining a titanium or titanium alloy sheet with a macromolecular material layer to give a composite material according to the invention.

The titanium composite material of the invention is useful as a corrosion-resistant or anticorrosive material in various fields as given below.

For example, aluminum materials, stainless steel materials and the like are in wide use as building materials or structural materials for general use. However, these metal materials need to be treated for prevention of corrosion because they are gradually eroded in evironmentally polluted surroundings or regions such as seawater, sea coasts contaminated by salt and areas afflicted with acid rain. An anticorrosion treatment is carried out by covering a metallic surface with metal-plating or by paint-coating a metallic surface after anodizing. These methods, however, provide only unsatisfactory protection against corrosion and weathers and are unable to inhibit the long-term progress of corrosion or deterioration, consequently necessitating periodic maintenance.

The titanium composite material of the invention incorporating a titanium material as a surface material can be used even under said unfavorable environments as a maintenance-free building material or a structural material or as a protective material or an exterior material useful for ships, offshore structures, harbor facilities and the like.

The titanium sheet in the titanium composite material of the invention can exhibit high corrosion resistance to the corrosive component-containing atmosphere and to highly corrosive nitric acid or like strong acids. Therefore, the titanium composite material of the invention is useful also as an interior material or an exterior material for inplant FRP tanks and pipings which are in contact with corrosive chemicals.

The titanium composite material of the invention is superior in weatherability to other metallic materials so that it is unlikely to discolor on exposure to ultraviolet ray. For example, automotive bodies, building materials (especially roof materials, exterior construction materials and so on) and the like are exposed to sunlight all the time. Accordingly they should be excellent in weatherability as well as in corrosion resistance. From this viewpoint, the titanium composite material of the invention with a high weatherability is useful as a maintenance-free material or a building material over an extended period of time.

Concrete for use as a structural material for dams or the like is deteriorated with time by polluted atmosphere, acid rain and the like. The titanium composite material of the invention is very useful as an exterior material for preventing the deterioration of concrete.

The titanium composite material of the invention is not limited in utility to the above-exemplified building materials, structural materials and the like but is also useful as a coating material in other fields wherein objects or bodies would be susceptible to damage by exposure to corrosion or photo-deterioration.

The titanium composite material of the invention is useful as a shielding material for protection against electromagnetic waves emitted from electronic equipment including television sets, portable telephones, personal computers, sound equipment, electronic ovens, etc.

BEST MODE FOR CARRYING OUT THE INVENTION

The features of the invention will be further clarified with reference to the following Examples.

In the Examples, FRP sheets and PCV sheets are used as a macromolecular material. However, the present invention is not limited to titanium composite materials containing these macromolecular materials. Similar remarkable effects can be produced by a titanium composite material containing, as a macromolecular material, AS resin, ABS resin, acrylic resin, polycarbonate, polypropylene, polyester, polyamide, ethylene-vinyl acetate copolymers, materials containing them as the main component or the like.

EXAMPLE 1

A titanium sheet (0.5 mm (thickness)×25 mm×120 mm) was subjected to a dipping treatment under the etching conditions shown in Table 1, was washed with water and was dried. Thereafter, a layer of acrylic resin-type tackifier (35 μm in thickness) or a layer of butyl rubber-type tackifier (650 μm in thickness) was formed on the etched titanium sheet. Further an FPR sheet (containing an unsaturated polyester resin as the matrix and glass fibers as a reinforcing material, 3.5 mm (thickness)×25 mm×120 mm) was laminated on the tackifier layer, whereby a titanium composite material according to the invention (bonded area=25 mm×25 mm) was produced.

The obtained titanium composite material was subjected to a tensile peeling test wherein the titanium sheet and the FRP sheet were pulled upward and downward as shown in FIG. 1 with the results (bond strength) shown in Table 2. The bond strength is expressed in terms of specific bond strength in Table 2 and other tables based on the condition that the bond strength of the composite material having a non-etched titanium sheet and an FRP sheet bonded together has a reference value of 100. The titanium sheet and FRP sheet composing the bonded specimens in the under-mentioned tensile peel tests had the same size as in Example 1.

TABLE 1

| Kind of etching agent | Concentration | Dipping temp. | Dipping time |
| --- | --- | --- | --- |
| Hydrofluoric acid | 5% | 20° C. | 2 min |
| Nitric acid | 5% | 20° C. | 2 min |
| Sulfuric acid | 5% | 20° C. | 2 min |

TABLE 2

| Kind of etching agent | Butyl rubber-type tackifier | Acrylic resin-type tackifier |
| --- | --- | --- |
| Hydrofluoric acid | 123.2 | 111.9 |
| Nitric acid | 102.9 | 102.3 |
| Sulfuric acid | 109.0 | 103.1 |

As apparent from the results of Table 2, the bond strength of the composite material was improved by etching the titanium sheet with an aqueous solution of an acid. Especially the bond strength between the titanium sheet and the macromolecular material layer was significantly enhanced by the etching treatment with an aqueous solution of hydrofluoric acid.

The bond strength was improved presumably because the passive state film was removed from the surface of titanium metal by the etching treatment with an aqueous solution of hydrofluoric acid or like acid.

EXAMPLE 2

A titanium sheet was dipped in each of aqueous solutions of hydrofluoric acid in varied concentrations for 2 minutes to undergo an etching treatment, followed by washing with water and drying.

A layer of butyl rubber-type tackifier 650 μm in thickness was formed on the etched titanium sheet. Then the tackifier layer was laminated on an FPR sheet, thereby producing a titanium composite material according to the invention.

The bond strength of the titanium composite material prepared in Example 2 is shown in Table 3.

TABLE 3

| Concentration of hydrofluoric acid | Butyl rubber-type tackifier |
|---|---|
| 0.3% | 101.7 |
| 0.5% | 102.3 |
| 1.0% | 114.7 |
| 2.5% | 124.4 |
| 5.0% | 123.4 |

It is clear from the results of Table 3 that the bond strength was markedly increased when the concentration of hydrofluoric acid was not lower than 1%.

EXAMPLE 3

A titanium sheet was dipped in each of solutions of primers shown in Table 4 and was held therein at 100° C. for 1 hour to undergo a primer coating.

TABLE 4

| Primer | Composition of solution | Presence or absence of unsaturated bond (C=C) |
|---|---|---|
| Tetraoctyl bisphosphite titanate | 1% Xylene | Present |
| Tetraoctyl bistitanate | 1% Xylene | Absent |
| Isopropyl tristiatanate | 1% Xylene | Absent |
| Isopropyl trititanate | 1% Xylene | Absent |
| Glycidoxy-propyl trimethoxy silane | 5%-water/acetone | Absent |
| Methacryloxy-propyl tri-methoxy silane | 5%-water/acetone | Present |
| Isocyanate | Base liquid | Present |

Thereafter titanium composite materials were prepared according to the invention by forming a layer of acrylic resin-type tackifier (35 μm in thickness) or a layer of butyl rubber-type tackifier (650 μm in thickness) on the primed titanium sheet, followed by lamination of an FRP sheet on the tackifier layer.

The bond strength of the obtained titanium composite materials is shown in Table 5.

TABLE 5

| Primer | Butyl rubber-type tackifier | Acrylic resin-type tackifier |
|---|---|---|
| Tetraoctyl bisphosphite titanate | 118.7 | 118.8 |
| Tetraoctyl bistitanate | 101.5 | 105.7 |
| Isopropyl tristitanate | 99.4 | 92.6 |
| Isopropyl trititanate | 103.3 | 100.7 |
| Glycidoxy-propyl trimethoxy silane | 55.4 | — |
| Methacryloxy-propyl tri-methoxy silane | 85.2 | — |
| Isocyanate | 103.5 | 103.6 |

As apparent from the results of Table 5, the bond strength was improved by priming the surface of titanium sheet with a tetraoctyl bisphosphite titanate-type coupling agent having an unsaturated bond in a hydrophobic group of the side chain.

The bond strength was improved presumably because the side chain of acrylic resin-type tackifier caused an addition reaction with the unsaturated bond in the hydrophobic group of priming agent. It is predictable that the same phenomenon will occur when a butyl rubber-type tackifier is used.

EXAMPLE 4

After a titanium sheet was subjected to an etching treatment and/or a reduction treatment, a bonding procedure was carried out in the same manner as in Example 1. Then the bond strength of the specimen was measured. Table 6 shows the conditions for treating the titanium sheets. Table 7 indicates the bond strength of titanium composite material specimens which underwent each of procedures A to G.

TABLE 6

| Procedure | Etching Treatment | Reduction Treatment |
|---|---|---|
| A | Dipped in 5% aqueous solution of hydrofluoric acid for 2 minutes | Not treated |
| B | Not treated | Dipped in 5% aqueous solution of sodium borohydride for 5 minutes |
| C | Not treated | Dipped in 20% aqueous solution of formic acid for 1 hour |
| D | Not treated | Electrolysis in 1% aqueous solution of ammonium hydrogenfluoride at current density of 10 A/dm$^2$ for 2 minutes |
| E | Dipped in 5% aqueous solution of hydrofluoric acid for 2 minutes | Dipped in 5% aqueous solution of sodium borohydride for 5 minutes |
| F | Dipped in 5% aqueous solution of hydrofluoric acid for 2 minutes | Dipped in 20% aqueous solution of formic acid for 1 hour |
| G | Dipped in 5% aqueous solution of hydrofluoric acid for 2 minutes | Electrolysis in 1% aqueous solution of ammonium hydrogenfluoride at current density of 10 A/dm$^2$ for 2 minutes |

TABLE 7

| Treatment conditions | Butyl rubber-type tackifier | Acrylic resin-type tackifier |
|---|---|---|
| A | 120.0 | 111.0 |
| B | 100.0 | 102.0 |
| C | 109.0 | 108.0 |
| D | 112.0 | 107.0 |
| E | 128.0 | 114.0 |
| F | 149.9 | 125.2 |
| G | 139.0 | 121.0 |

As apparent from the results of Table 7, the bond strength of titanium composite material was pronouncedly increased by the etching treatment of titanium sheet with an aqueous solution of hydrofluoric acid and the reduction treatment thereof (clear from comparison of A with E, F and G).

In view of the results of Table 1, it is presumable that after the passive state film was removed by the etching treatment with the aqueous solution of hydrofluoric acid, the re-formation of passive state film was prevented from the surface of the titanium material having a high affinity with oxygen, whereby the bonding degree was enhanced. Especially when electrolytic reduction was conducted, the bonding degree was notably enhanced.

Even when the titanium sheet was subjected only to a reduction treatment (B, C, D), the bond strength was improved presumably because the passive state film as an oxidized film was partially destroyed due to etching capability and electrolytically reducing capability of the solution of ammonium hydrogenfluoride, resulting in enhancement of bond strength.

EXAMPLE 5

A titanium sheet was subjected to an electrolytic reduction treatment at a specified current density for 2 minutes in each of solutions after or without etching treatment (by dipping in a 5% aqueous solution of hydrofluoric acid for 2 minutes). Then the titanium sheet was washed with water and dried. A layer of butyl rubber-type tackifier 650 μm in thickness was formed on the titanium sheet after which an FRP sheet was laminated on the tackifier layer, whereby a titanium composite material according to the present invention was produced.

The bond strength of the obtained titanium composite material is shown in Table 8.

TABLE 8

| Kind of electrolytically treating agent | Absence of etching treatment | Presence of etching treatment |
|---|---|---|
| 5% Ammonium fluoride | 99.7 | 132.3 |
| 5% Sodium fluoride | 99.2 | 130.3 |
| 5% Ammonium formate | 99.6 | 131.8 |
| 5% Sodium formate | 99.1 | 130.6 |
| 5% Sodium sulfate | 98.7 | 130.3 |

As apparent from the results of Table 8, the bond strength was further increased by the electrolytic reduction treatment following the etching treatment of the titanium sheet with the aqueous solution of hydrofluoric acid.

EXAMPLE 6

A titanium sheet was dipped in each of aqueous solutions of formic acid in varied concentrations for 1 hour without or after etching treatment of titanium sheet (by dipping in a 5% aqueous solution of hydrofluoric acid for 2 minutes). Then the titanium sheet was washed with water and dried. A layer of butyl rubber-type tackifier 650 μm in thickness was formed on the above-treated titanium sheet after which an FRP sheet was laminated on the tackifier layer, whereby a titanium composite material according to the present invention was produced. The bond strength of the obtained titanium composite material is shown in Table 9.

TABLE 9

| Concentration of aqueous solution of formic acid | Absence of etching treatment | Presence of etching treatment |
|---|---|---|
| 1% | 105.0 | 128.1 |
| 2.5% | 106.6 | 131.8 |
| 5% | 117.0 | 150.4 |
| 10% | 116.7 | 151.9 |
| 20% | 116.7 | 152.1 |

As apparent from the results of Table 9, the bond strength of the titanium composite material was increased by dipping the titanium sheet in each aqueous solution of formic acid following the etching treatment with the aqueous solution of hydrofluoric acid. Especially the bond strength was significantly increased when the concentration of formic acid in the aqueous solution was 5% or above.

EXAMPLE 7

A titanium sheet was subjected to an etching treatment (by dipping in a 5% aqueous solution of hydrofluoric acid for 2 minutes) and to a dipping treatment in each of two different aqueous solutions of formic acid for a specific time period. Thereafter the titanium sheet was washed with water and dried. A layer of butyl rubber-type tackifier 650 μm in thickness was formed on the titanium sheet after which an FRP sheet was laminated on the tackifier layer, whereby a titanium composite material according to the present invention was produced. The bond strength of the obtained titanium composite material is shown in Table 10.

TABLE 10

| Dipping time | 5% Aqueous solution of formic acid | 20% Aqueous solution of formic acid |
|---|---|---|
| 5 | 132.9 | 138.9 |
| 10 | 154.5 | 156.3 |
| 30 | 151.4 | 152.2 |

As apparent from the results of Table 10, the bond strength of the titanium composite material was further increased by dipping the titanium sheet in the aqueous solution of formic acid for 5 minutes or longer following the etching treatment.

EXAMPLE 8

A titanium sheet was subjected to an electrolytic reduction treatment at varied current densities for 2 minutes in a 1% aqueous solution of hydrofluoric acid after or without etching treatment of titanium sheet (by dipping in a 5% aqueous solution of hydrofluoric acid for 2 minutes). Then the titanium sheet was washed with water and dried. A layer of butyl rubber-type tackifier 650 μm in thickness was formed on the titanium sheet after which an FRP sheet of 3.5 mm in thickness was laminated on the tackifier layer, whereby a titanium composite material according to the present invention was produced. The bond strength of the obtained titanium composite material is shown in Table 11.

TABLE 11

| Current density in electrolytic treatment (A/dm$^2$) | Presence or absence of etching treatment before electrolytic treatment | |
|---|---|---|
| | Absent | Present |
| 1 | 100 | 143.6 |
| 5 | 101.5 | 151.6 |

TABLE 11-continued

| Current density in electrolytic treatment (A/dm$^2$) | Presence or absence of etching treatment before electrolytic treatment | |
|---|---|---|
| | Absent | Present |
| 10 | 113.0 | 151.8 |
| 30 | 118.2 | 151.8 |
| 50 | 118.3 | 151.8 |

As apparent from the results of Table 11, even when the electrolytic reduction treatment was performed at a current density as low as 1 A/dm$^2$, the bond strength of the obtained titanium composite material was markedly increased by the etching treatment with the aqueous solution of hydrofluoric acid before the reduction treatment.

EXAMPLE 9

A titanium sheet was subjected to an etching treatment (by dipping in a 5% aqueous solution of hydrofluoric acid for 2 minutes), a reduction treatment (electrolytic reduction at a current density of 10 A/dm$^2$ in a 1% solution of ammonium hydrogenfluoride), a primer treatment (coating the titanium sheet with a 1 wt. % xylene solution of a tetraoctyl bisphosphite titanate-type coupling agent and drying at 100° C. for 1 hour) or to a series of these three treatments, followed by the same procedure as in Example 1, whereby a titanium composite material according to the present invention was produced. The bond strength of the obtained titanium composite material is shown in Table 12.

TABLE 12

| Treatment of titanium sheet | Butyl rubber-type tackifier | Acrylic resin-type tackifier |
|---|---|---|
| Etching treatment | 120.0 | 111.0 |
| Electrolytic reduction treatment | 112.0 | 107.0 |
| Primer treatment | 110.2 | 109.3 |
| Combination of three treatments | 153.2 | 129.5 |

As apparent from the results of Table 12, the bond strength of the obtained titanium composite material can be remarkably increased by conducting a combination of the etching treatment with hydrofluoric acid, the electrolytic reduction treatment and the treatment with the priming agent having an unsaturated bond in a hydrophobic group of the side chain.

EXAMPLE 10

A titanium sheet was subjected to an etching treatment by dipping in a 5% aqueous solution of hydrofluoric acid for 2 minutes and to an electrolytic reduction treatment using two types of electrolytes at varied current densities. A layer of butyl rubber-type tackifier 650 μm in thickness was formed on the treated titanium sheet after which an FRP sheet 3.5 mm in thickness was laminated on the tackifier layer, whereby a titanium composite material according to the present invention was produced. The bond strength of the obtained titanium composite material is shown in Table 13.

TABLE 13

| | Electrolyte | |
|---|---|---|
| Current density (A/dm$^2$) | 1% aqueous solution of ammonium fluoride | 1% aqueous solution of ammonium formate |
| 1 | 144.3 | 142.6 |
| 5 | 148.6 | 147.4 |
| 10 | 146.1 | 145.1 |

As apparent from the results of Table 13, the bond strength of the titanium composite material was markedly increased by the electrolytic reduction at a current density as low as 1 A/dm$^2$ irrespectively of a difference of electrolyte after the etching treatment with hydrofluoric acid.

EXAMPLE 11

A titanium sheet was dipped in a 5% aqueous solution of hydrofluoric acid for 2 minutes to undergo an etching treatment, and also was dipped in aqueous solutions of formic acid in varied concentrations. A layer of acrylic resin-type tackifier 35 μm in thickness was formed on the above-treated titanium sheet. Further a sheet of polyvinyl chloride (PVC) of 1 mm thickness was superposed on the tackifier layer, thereby producing a titanium composite material according to the invention.

Figure 2:
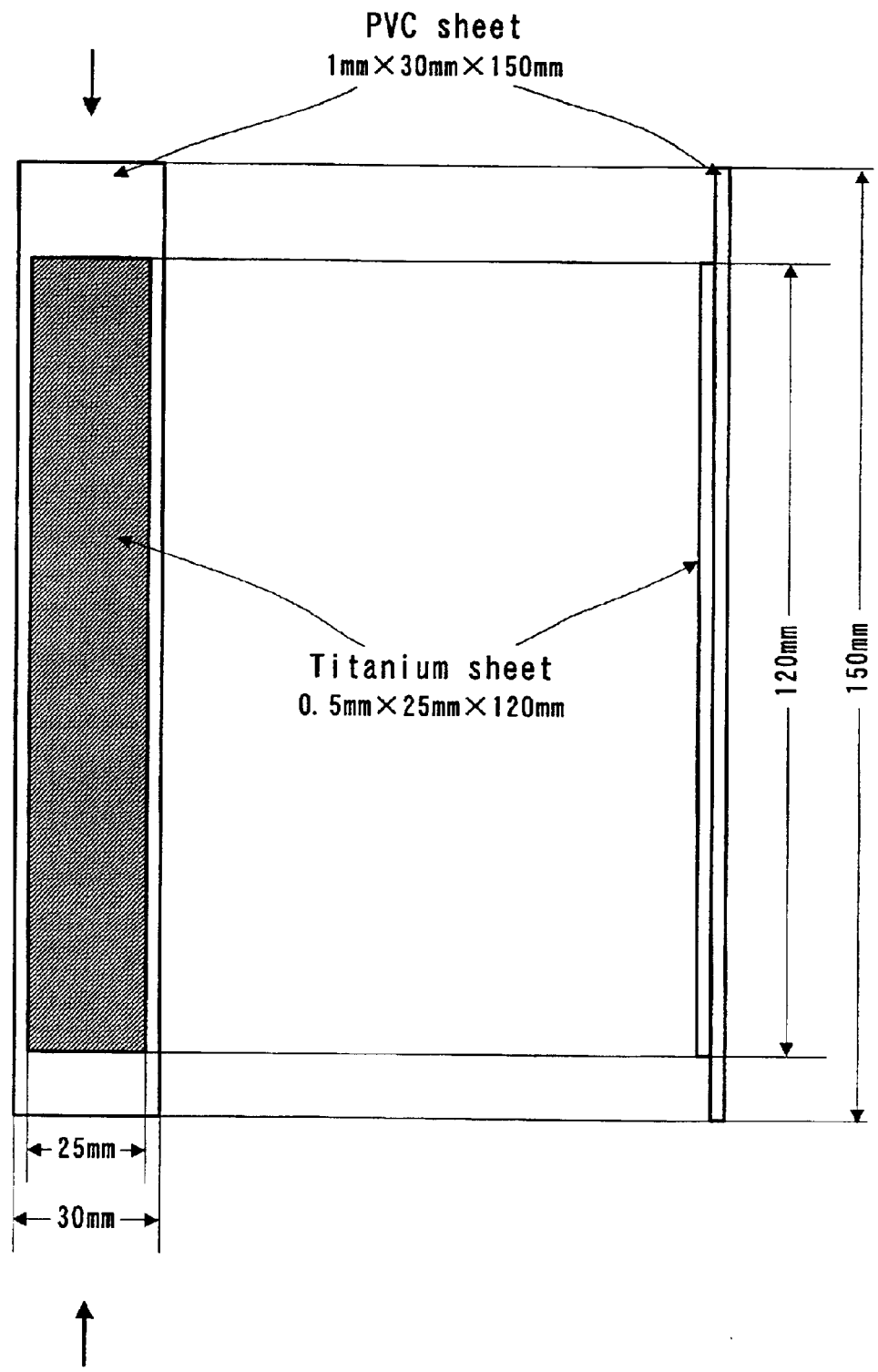
FIG. 2 is a view showing a specimen for measuring the peel resistance of the titanium composite material of the invention.

A force was exerted from upward and downward as shown in FIG. 2 so as to give rise to bending on the titanium sheet side of composite material until peel was induced at the interface between the tackifier layer and the PVC sheet, whereby an angle at which the peel occurred was determined.

The results are shown in Table 14. The values of Table 14 are those of specific peel angle which was given by the following method: an untreated titanium sheet was joined to a PVC sheet with an acrylic resin-type tackifier to produce a titanium composite material and the peel angle of the obtained titanium composite material was taken as 100 (reference value). The higher the value is, the more resistant to the occurrence of peel is.

TABLE 14

| Concentration of formic acid in aqueous solution | Absence of etching treatment | Presence of etching treatment |
|---|---|---|
| 1% | 111.0 | 168.6 |
| 2.5% | 112.3 | 205.3 |
| 5% | 126.1 | 209.8 |
| 10% | 124.2 | 208.9 |
| 20% | 124.2 | 210.2 |

As clear from the results of Table 14, when the titanium sheet was subjected to etching treatment with an aqueous solution of hydrofluoric acid and then to dipping treatment with an aqueous solution of formic acid, the resultant titanium composite material of the invention showed an improved peel resistance even when a force was exerted on the material to an extent of causing bending.

EXAMPLE 12

A titanium sheet was subjected to any of procedures of (a) dipping a titanium sheet in a 5% aqueous solution of hydrofluoric acid for 2 minutes to undergo an etching treatment, followed by washing with water and drying, (b) dipping a titanium sheet in a 20% aqueous solution of formic acid for 1 hour, followed by washing with water and drying, (c) coating a titanium sheet with a 1% xylene solution of tetraoctyl bisphosphite titanate-type coupling agent and drying the same at 100° C. for 1 hour, and (d) carrying out a combination of procedures (a) to (c) in this order. A layer of an acrylic resin-type tackifier 35 µm in thickness was formed on the titanium sheet treated by any of said procedures, and a polyvinyl chloride (PVC) sheet 1 mm in thickness was laminated on the tackifier layer, whereby a titanium composite material in accordance with the invention was produced.

A force was exerted on the obtained titanium composite material in the same manner as in Example 11 to give rise to bending, whereby the peel resistance of each titanium composite material was determined with the results shown in Table 15.

TABLE 15

| Treatment of titanium sheet | Specific peel strength |
|---|---|
| Etching treatment | 163.0 |
| Treatment with an aqueous solution of formic acid | 124.2 |
| Primer treatment | 111.4 |
| A combination of three treatments | 235.0 |

As apparent from the results of Table 15, the peel resistance of the titanium composite material was greatly increased by carrying out a combination of etching treatment with hydro-fluoric acid, reduction treatment and primer treatment.

EXAMPLE 13

A titanium sheet was dipped in a 5% aqueous solution of hydrofluoric acid for 2 minutes to undergo an etching treatment, followed by washing with water and drying. Thereafter a layer of acrylic resin-type tackifier (35 µm in thickness) was applied to the treated surface of titanium sheet and a mold release liner was fixed to the surface of the tackifier layer.

The mold release liner can be peeled from the composite material and joined to an object or a structure before use to provide them with a protective surface.

What is claimed is:

1. A process for preparing a titanium composite material, the process comprising the following steps in sequence:
    (a) etching a surface of titanium sheet or a titanium alloy sheet with an etching agent to remove a passive state film therefrom, and then rinsing the etched sheet with water;
    (b) reducing the titanium sheet or the titanium alloy sheet having the etched surface by dipping the sheet in about 1 to about 25 weight percent aqueous solution of a reducing agent for about 5 to about 60 minutes; and
    (c) bonding a macromolecular material to the titanium sheet or the titanium alloy sheet having the reduced surface to be bonded.

2. The process according to claim 1, wherein the reduced surface of the titanium sheet or titanium alloy sheet to be bonded has substantially no passive state film thereon.

3. The process according to claim 1, wherein the etching agent is at least one aqueous solution selected from the group consisting of hydrofluoric acid, ammonium hydrogen fluoride, sulfuric acid, hydrochloric acid, and oxalic acid.

4. The process according to claim 1, wherein the reducing agent is formic acid or sodium borohydride.

5. The process according to claim 1, wherein the titanium sheet or titanium alloy sheet has a thickness of 0.1 to 500 µm.

6. The process according to claim 1, wherein the titanium sheet or titanium alloy sheet has a thickness of 1 to 50 µm.

7. The process according to claim 1, wherein the macromolecular material is formed of a thermosetting resin or a thermoplastic resin.

8. The process according to claim 1, wherein the macromolecular material is a thermosetting resin and the bonding is attained using an adhesive.

9. The process according to claim 8, wherein the bonding is attained using an acrylic resin or butyl rubber tackifier.

10. The process according to claim 1, wherein the macromolecular material is a thermoplastic resin, and the titanium sheet or titanium alloy sheet having the reduced surface to be bonded is press-bonded to a melt of a thermoplastic resin.

11. A process for preparing a titanium composite material, the process comprising the following steps in sequence:
    (a) etching a surface of a titanium sheet or a titanium alloy sheet with an etching agent to remove a passive state film therefrom, and then rinsing the etched sheet with water;
    (b) reducing the titanium sheet or the titanium alloy sheet having the etched surface by dipping the sheet in about 1 to about 25 weight percent aqueous solution of a reducing agent for about 5 to about 60 minutes;
    (c) coating the titanium sheet or the titanium alloy sheet having the reduced surface with a primer; and
    (d) bonding a macromolecular material to the titanium sheet or a titanium alloy sheet having the coated surface to be bonded.

12. The process according to claim 11, wherein the primer is a coupling agent.

13. The process according to claim 12, wherein the coupling agent is the titanate having an unsaturated bond in the side chain.

* * * * *